(No Model.)

W. J. POWELL.
Cotton Harvester.

No. 239,190.        Patented March 22, 1881.

WITNESSES:
Francis McArdle.
C. Sedgwick.

INVENTOR:
W. J. Powell
BY Munn & Co.
ATTORNEYS.

UNITED STATES PATENT OFFICE.

WILLIAM J. POWELL, OF MARSHFIELD, MASSACHUSETTS.

COTTON-HARVESTER.

SPECIFICATION forming part of Letters Patent No. 239,190, dated March 22, 1881.

Application filed November 8, 1880. (No model.)

*To all whom it may concern:*

Be it known that I, WM. J. POWELL, of Marshfield, Plymouth county, Massachusetts, have invented an Improvement in Cotton-Harvesters, of which the following is a specification.

The object of the invention is to gather cotton from the plant while in the field by means of a vacuum, as hereinafter described.

Figure 1:
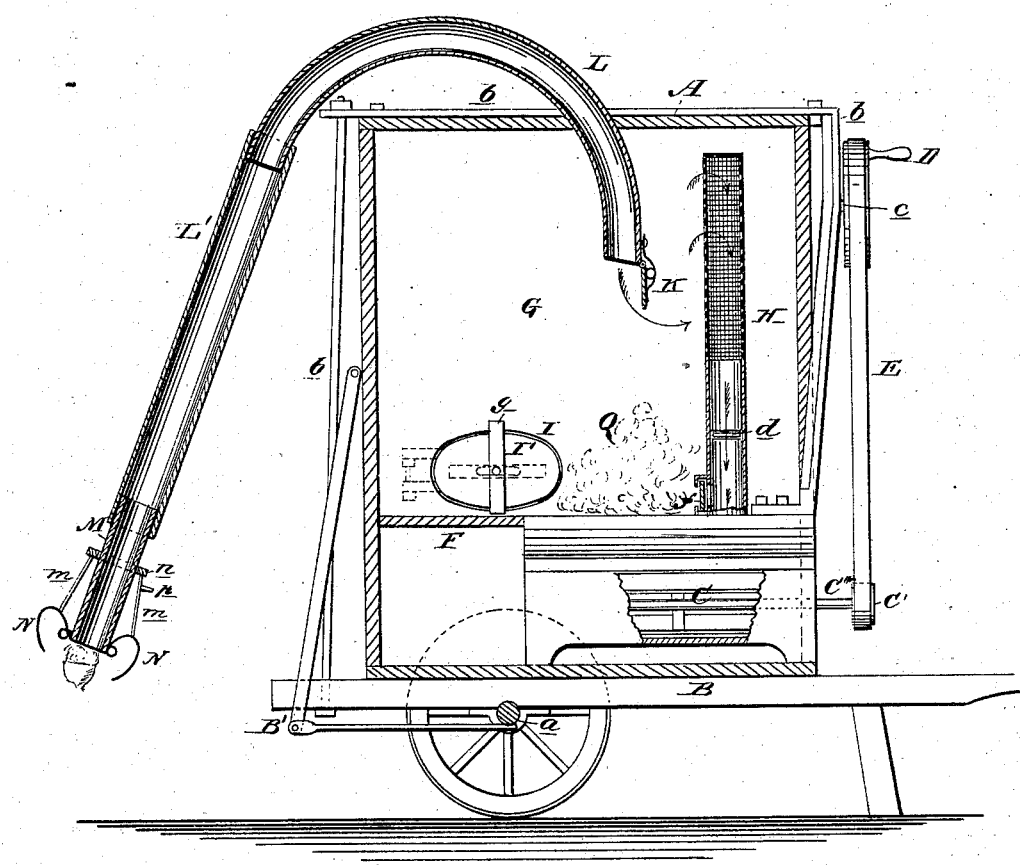
Figure 2:
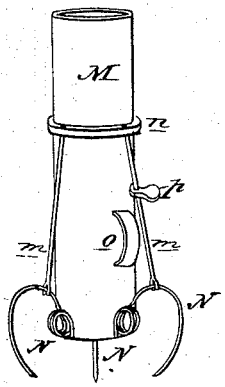

Figure 1 of drawings is a sectional side elevation. Fig. 2 is an enlarged view, in elevation, of the end of the tube with the fingers.

A represents the cotton-receptacle fixed on a wheeled frame, B, having handle B' attached to axle $a$ by straps.

C is a fan-box fast on the bottom of receptacle A, and in which is revolved the fan by the hand mechanism D E C' C''.

F is a floor on a level with the top of the fan-box, and forming the bottom of a vacuum-chamber, G.

H is a tube rising from the fan-box nearly to the top of receptacle A, the upper part being reticulated, the top closed, and the lower part provided with the valves $d f$.

I represents a doorway in the side of the receptacle for the discharge of the cotton, and I' the door, which covers it with an air-tight joint.

L is a tube having one end valved at K, on the inside of the chamber G, from which it extends around to the front, and has on its outer end a flexible tube, L', in the lower end of which is inserted a short metal tube, M, whose mouth is to be applied by hand to the plant.

N N N are three curved spring-fingers, which are held apart by springs and provided with points converging toward a common center, about an inch below the mouth of said tube M. They are connected, by rods $m$, with a movable collar, $n$, on the tube.

The operation is as follows: The harvester, being moved into the field, proceeds from plant to plant, and the operator takes hold of the tube M, introducing his hand beneath a loop, O, and guiding the mouth of the tube toward the plant. The fan is then turned to produce a suction and draw the cotton from the plant up through the tube into the chamber G, the valve $d$ being open. The reticulated upper part of the tube H allows a ready passage of the air, but prevents the ingress of the cotton. If the cotton on a boll should present too great a resistance for the suction, the operator places his thumb on the thumb-piece $p$ on rod $m$ and forces the points of the fingers into the boll, so as to loosen the cotton. When chamber G is filled the motion of the fan is reversed, the valve $d$ being closed and the valve $f$ being opened. The valve K is also closed and the door I' opened until the cotton has been forced out into a suitable receptacle.

On experiment it is found that an operator and assistant will gather more lint and seed than ten good pickers, while the bolls are picked cleaner and the cotton delivered in better condition.

Having thus described all that is necessary to a full understanding of my invention, what I claim as new is—

1. The combination, with a receptacle, A, having an upper chamber, G, with the door I', and a suitable cotton-picker mechanism connected therewith, of a fan and box, C, the latter provided with a top-closed tube, H, reticulated in the upper part, and having valves $d f$ in the lower part, as shown and described.

2. The combination of the chamber G, for the reception of the cotton, the receptacle having doorway I, the fan and the fan-case having tube H, with valves $d f$, whereby the cotton may be discharged, as set forth.

3. In a cotton-harvester, the combination, with the tube L L' M, of the spring-held fingers N, rods $m$, collar $n$, and thumb-piece $p$, as and for the purpose set forth.

4. In a cotton-harvester, the combination of the following elements: a vacuum-chamber, an exhaust-fan, a perforated and valved exhaust-pipe, and a flexible tube, the whole adapted to take cotton from the end of tube into a receptacle, as set forth.

WILLIAM J. POWELL.

Witnesses:
BENJAMIN J. LEWIS,
AMASA M. BARTLETT.